US010088810B2

(12) United States Patent
Griffin

(10) Patent No.: US 10,088,810 B2
(45) Date of Patent: Oct. 2, 2018

(54) INCREASED SERVO CONTROL SYSTEM BANDWIDTH USING A TUNED MASS DAMPER

(71) Applicant: The Boeing Company, Chicago, IL (US)

(72) Inventor: Steven Griffin, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/189,105

(22) Filed: Jun. 22, 2016

(65) Prior Publication Data

US 2017/0371303 A1 Dec. 28, 2017

(51) Int. Cl.
G05B 5/01 (2006.01)
G05B 6/02 (2006.01)
H02K 5/24 (2006.01)

(52) U.S. Cl.
CPC ............. G05B 6/02 (2013.01); G05B 5/01 (2013.01); H02K 5/24 (2013.01); G05B 2219/41193 (2013.01); G05B 2219/49048 (2013.01); G05B 2219/49054 (2013.01)

(58) Field of Classification Search
CPC ............ F16F 7/104; F16F 7/112; F16F 7/116
See application file for complete search history.

(56) References Cited

U.S. PATENT DOCUMENTS

| 6,315,094 | B1 | 11/2001 | Griffin et al. |
| 8,800,736 | B2 | 8/2014 | Kashani |
| 2003/0061767 | A1* | 4/2003 | Hanagan ............. E04B 1/985 52/1 |
| 2010/0057260 | A1* | 3/2010 | Fallahi ............. F16F 7/1005 700/280 |

FOREIGN PATENT DOCUMENTS

| CN | 102 645 895 | 8/2012 |
| EP | 0 943 406 | 9/1999 |

OTHER PUBLICATIONS

Cam Kees Verbaan, "Robust Mass Damper Design for Bandwidth Increase of Motion Stages", published Apr. 20, 2015, Retrieved from the Internet: URL:https//pure.tue.nl/ws/files/02503101/20160420_Verbaan.pdf [retrieved Apr. 24, 2018].

(Continued)

Primary Examiner — Muhammad S Islam
(74) Attorney, Agent, or Firm — McDonnell Boehnen Hulbert & Berghoff LLP

(57) ABSTRACT

An example servo control system includes one or more components configured to be actuated for movement, a system controller including one or more processors for receiving feedback of the movement of the one or more components and for using the feedback within a control loop to cause an actuator to reduce error of the movement of the one or more components, and a tuned mass damper (TMD) physically connected to the one or more components. Parameters of the TMD are selected to add phase margin at a crossover frequency of the servo control system, and the TMD includes a mass coupled to the one or more components, a damper connected between the mass and the one or more components, and a spring component connected between the mass and the one or more components.

18 Claims, 9 Drawing Sheets

(56) References Cited

OTHER PUBLICATIONS

Omer F. Tigli, "Optimum Vibration Absorber (tuned mass damper) Design for Linear Damped Systems Subjected to Random Loads", Journal of Sound and Vibration, vol. 331, Jun. 1, 2012, pp. 3035-3049.
Extended European Search Report prepared by the European Patent Office in Application No. 17 168 009.3 dated Mar. 29, 2018.

\* cited by examiner

Open loop plant

Error rejection

Open loop plant

Error rejection

Open loop plant

Error rejection

Open loop plant

Error rejection

INCREASED SERVO CONTROL SYSTEM BANDWIDTH USING A TUNED MASS DAMPER

FIELD

The present disclosure generally relates to servo control system operations, and more particularly to methods to increase a servo control system effective bandwidth using a tuned mass damper (TMD) to add phase margin at a crossover frequency of the servo control system.

BACKGROUND

Servo control systems use feedback to command a control actuator to reduce error between desired behavior and observed behavior of components of a system, as measured by a control sensor. A common example of this is a motorized, gimbaled telescope that may be given specific coordinates to observe a target. A servo control system acts to command motors in each axis of the telescope to minimize an error between known coordinates of the target and a current position of the telescope as determined by an angular position sensor. A "closed loop" controlled telescope would reject being pushed away from a commanded target position by external disturbances.

The real world limitation in this example, and other feedback control applications, is a speed that the desired position can be achieved and a closely related maximum frequency disturbance that the telescope system can reject. This limitation can be made more severe by time delays that introduce latency in a control loop of the servo control system. Every real world application has latency as a limitation (e.g., movement of components lags behind commands), and all digital control systems further introduce latency that is directly related to a sample rate of the digital system. Signal conditioning to reduce sensor noise further introduces additional latency.

A common physical manifestation of a feedback servo control system that is pushed to a relatively high bandwidth in the presence of latency is a potential for oscillation that occurs at or near a bandwidth frequency of the servo control system. Decreasing latency may require redesign of the servo control system or may not be possible. It might also require redesign of components of the underlying structural system, which can be costly.

What is needed is a method to increase control bandwidth of a servo control system in the presence of latency.

SUMMARY

In one example, a method to increase a servo control system effective bandwidth is described. The method comprises coupling a tuned mass damper (TMD) to a servo control system, and the servo control system includes one or more components configured to be actuated for movement, and parameters of the TMD are selected to add phase margin at a crossover frequency of the servo control system. The parameters of the TMD are selected based on (i) tuning an uncoupled resonance frequency of the TMD to the crossover frequency of the servo control system, (ii) determining a mass of the TMD to be less than about 10% of a mass of the one or more components being actuated, and (iii) optimizing a damping of the TMD to decrease a peak of an error rejection of the servo control system based on the selected frequency and mass. The method also comprises operating the servo control system with the coupled TMD to increase phase margin and counteract a latency of a control loop of the servo control system.

In another example, a servo control system is described comprising one or more components configured to be actuated for movement, a system controller including one or more processors for receiving feedback of the movement of the one or more components and for using the feedback within a control loop to cause an actuator to reduce error of the movement of the one or more components, and a tuned mass damper (TMD) physically connected to the one or more components. Parameters of the TMD are selected to add phase margin at a crossover frequency of the servo control system, and the TMD includes a mass coupled to the one or more components, a damper connected between the mass and the one or more components, and a spring component connected between the mass and the one or more components. The parameters of the TMD are selected based on (i) tuning an uncoupled resonance frequency of the TMD to the crossover frequency of the servo control system, (ii) determining a mass of the TMD to be less than about 10% of a mass of the one or more components being actuated, and (iii) optimizing a damping of the TMD to decrease a peak of an error rejection of the servo control system based on the selected frequency and mass.

In still another example, a method of operating a servo control system is described. The method comprises coupling a tuned mass damper (TMD) to a servo control system, and the servo control system includes one or more components configured to be actuated for movement and a system controller including one or more processors. Parameters of the TMD are selected to add phase margin at a crossover frequency of the servo control system. The method also comprises operating the servo control system with the coupled TMD to increase phase margin and counteract a latency of a control loop of the servo control system, and receiving, by the system controller, feedback of the movement of the one or more components of the servo control system being actuated. The method also comprises using the feedback within a control loop to cause an actuator to reduce error of the movement of the one or more components, and adjusting, by a tuner coupled to the system controller, the parameters of the TMD based on a presence of a latency of the control loop of the servo control system so as to increase phase margin of the servo control system without altering the control loop of the servo control system.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Disclosed embodiments will now be described more fully hereinafter with reference to the accompanying Figures, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Some limitations in servo control systems include a speed that a desired position can be achieved and a closely related maximum frequency disturbance that the servo control system can reject. Examples described herein include a tuned mass damper (TMD) used in a nontraditional application to decrease negative effects of latency and increase achievable performance of the servo control system. Within examples, the TMD may not perform a traditional application of increasing damping of a structural mode, but rather is implemented to alter dynamics of the servo control system to counteract latency and avoid oscillation at high gain.

As an example, methods to increase a servo control system effective bandwidth are described, and include coupling a tuned mass damper (TMD) to the servo control system. Parameters of the TMD are selected to add phase margin at a crossover frequency of the servo control system. For example, the parameters of the TMD are selected based on tuning an uncoupled resonance frequency of the TMD to the crossover frequency of the servo control system, determining a mass of the TMD to be less than about 10% of a mass of the servo control system, and optimizing a damping of the TMD to decrease a peak of an error rejection of the servo control system based on the selected frequency and mass. Following, the servo control system is operated with the coupled TMD to increase phase margin and counteract a latency of a control loop of the servo control system.

By the term "about" or "substantially" with reference to amounts or measurement values, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
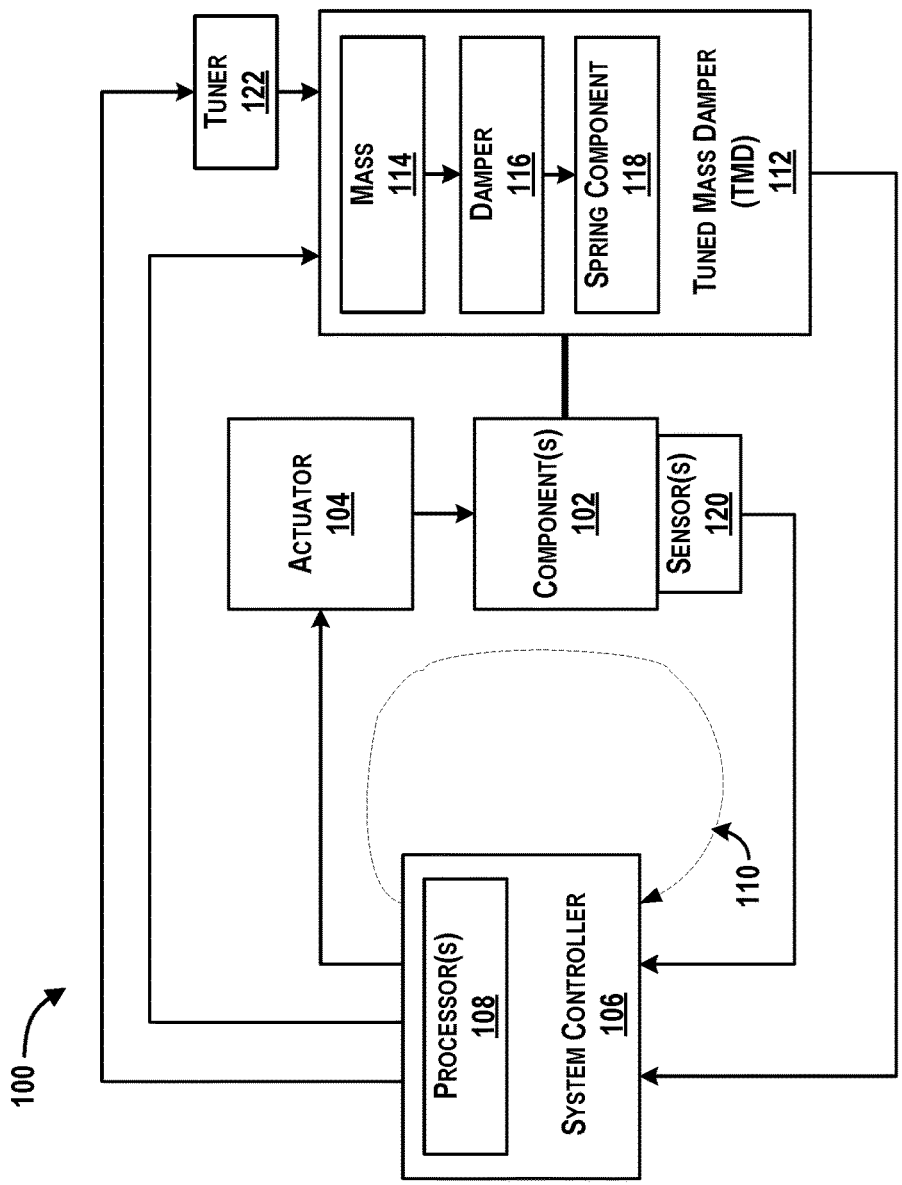
FIG. 1 illustrates an example servo control system, according to an example embodiment.

Referring now to FIG. 1, a servo control system 100 is illustrated, according to an example embodiment. The servo control system 100 includes one or more component(s) 102 configured to be actuated for movement by an actuator 104, and a system controller 106 including one or more processors 108 for receiving feedback of the movement of the component(s) 102, and for using the feedback within a control loop 110 to cause the actuator 104 to reduce error of the movement of the component(s) 102. The servo control system 100 also includes a tuned mass damper (TMD) 112 physically connected to the component(s) 102. The parameters of the TMD 112 are selected to add phase margin at a crossover frequency of the servo control system 100. The TMD 112 includes a mass 114 coupled to the component(s) 102, a damper 116 connected between the mass 114 and the component(s) 102, and a spring component 118 connected between the mass 114 and the component(s) 102. One or more sensors 120 are also included and coupled to the component(s) 102 to measure a displacement or amount of movement of the component(s) 102, for example, so as to provide feedback of the movement of the component(s) 102 to the system controller 106.

The servo control system 100 thus receives feedback of the movement of the component(s) 102, and when the feedback does not match a command, an error is computed and used within the control loop 110 to cause the actuator 104 to adjust movement of the component(s) 102. Thus, the system controller 106 can receive outputs of the sensor(s) 120 that indicate movement of the component(s) 102, and when the movement does not match a command, adjustments of the movement by the actuator 104 can be made to correct the error.

FIG. 1 illustrates an example of a system that is related to many applications that employ servo control.

Figure 2:
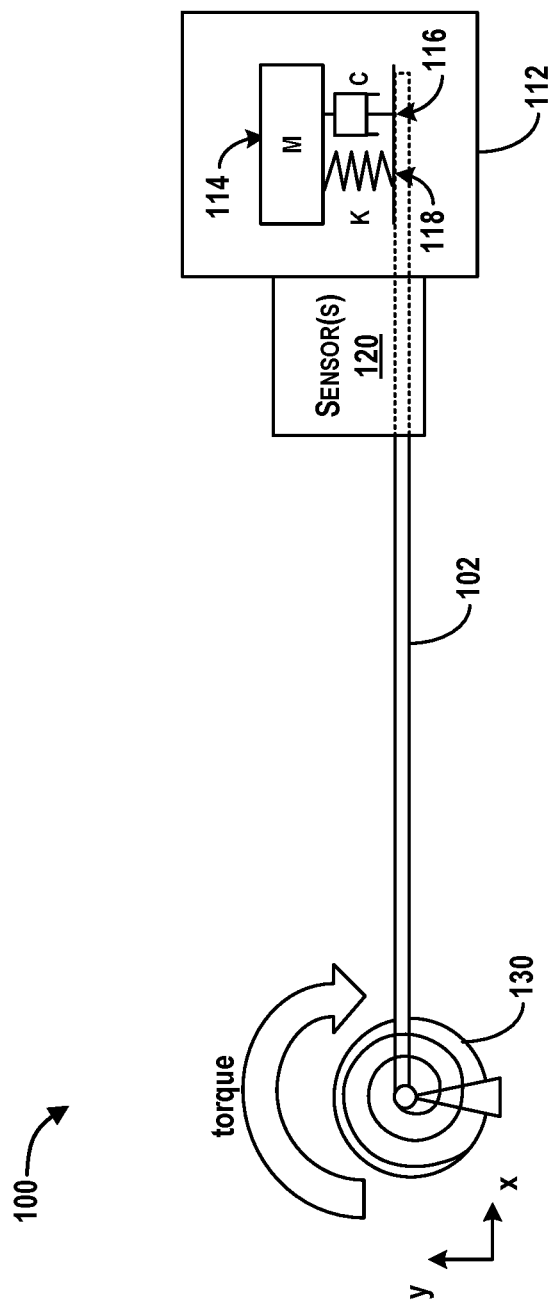
FIG. 2 illustrates an example of the servo control system implemented with a compliant beam with a coupled TMD, according to an example embodiment.

FIG. 2 illustrates an example of the servo control system 100 implemented with a compliant beam with a coupled TMD 112, according to an example embodiment. In this example, the component 102 include a beam, and a torque is be applied to a left hand side of the beam to rotate the beam around a bearing boundary condition that allows rotation, but that has some stiffness determined by a spring 130. Thus, the spring 130 allows movement of the component 102, but only to a certain extent. A soft spring example of this implementation includes a gimbaled telescope or a Segway transporter, and a stiffer spring implementation includes a steering mirror or control valve, as examples.

The torque command in this example is calculated by the system controller 106 to minimize error between a desired position of a tip of the beam and an actual position. The sensor(s) 120, which can include a displacement sensor or a rate sensor, are positioned on a ride side of the beam to measure movement in the y direction.

Referring back to FIG. 1, the system controller 106 can take the form of a computing device that includes the processor(s) 108, which may be a general-purpose processor or a special purpose processor (e.g., digital signal processors, application specific integrated circuits, etc.). The processor(s) 108 can be configured to execute program instructions (e.g., computer-readable program instructions) that are stored in the data storage and are executable to provide the functionality of the servo control system 100 described herein. Data storage may include or take the form of one or more computer-readable storage media that can be read or accessed by the processor(s) 108. The computer-readable storage media can include volatile and/or non-volatile storage components, such as optical, magnetic, organic or other memory or disc storage, which can be integrated in whole or in part with the processor(s) 108. The data storage is considered non-transitory computer readable media.

Use of the TMD 112 described herein is a nontraditional application of a TMD to decrease negative effects of latency of the servo control system 100 and increase achievable performance of the servo control system 100. Within examples, the TMD 112 does not perform its traditional role of increasing damping of a structural mode, but rather alters dynamics of the servo control system 100 to counteract latency and avoid oscillation at high gain.

A servo control system designed to compensate for errors in movement of a system having the configuration shown in FIG. 2 can be characterized by its open-loop plant that is used to determine gain and phase margin, and its error rejection that plots performance of the servo control system 100 as a function of frequency. The open-loop plant can be shown in a Bode diagram to quantify how well an output, or feedback, follows a command by showing a relationship between magnitude and phase, and a frequency of excitation. Below, first the open-loop plant and error rejection plots are shown and described for the servo control system 100 without a coupled TMD 112, and secondly plots are shown with the coupled TMD 112 to illustrate improved performance.

Figure 3:
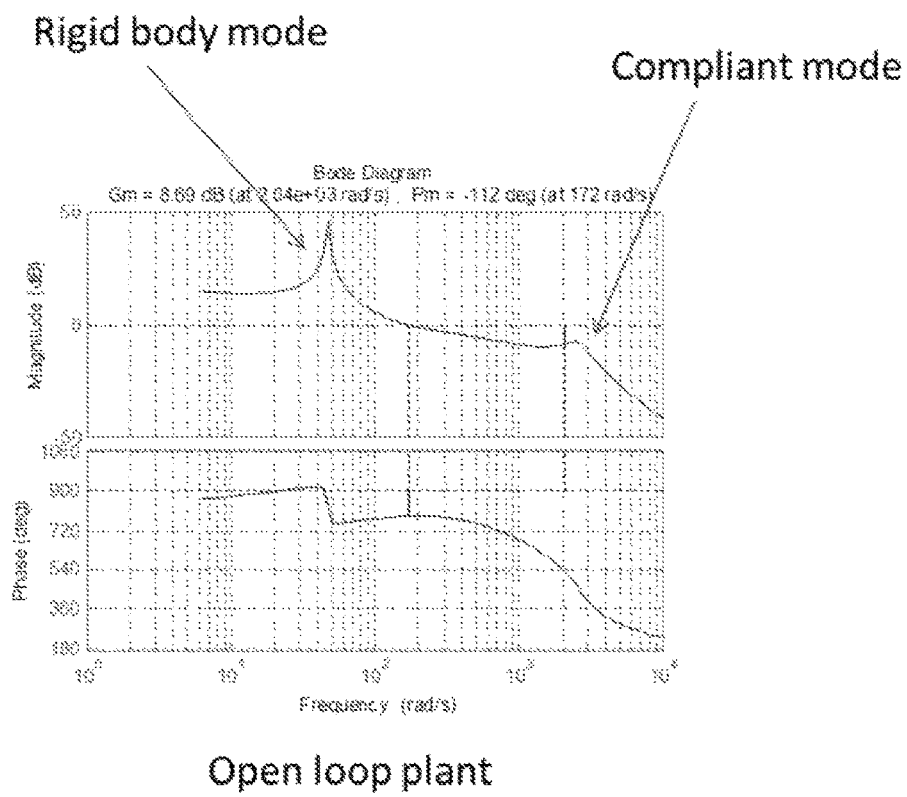
FIG. 3 illustrates an example Bode diagram plot for a version of a feedback control loop of the servo control system without a coupled TMD, using a digital proportional-integral-differential (PID) implementation with no delays other than that due to discretization, according to an example embodiment.

FIG. 3 illustrates an example Bode diagram plot for a version of a feedback control loop of the servo control system 100 without a coupled TMD, using a digital proportional-integral-differential (PID) implementation with no delays other than that due to discretization, according to an example embodiment. Here, the open-loop plant Bode diagram shows a phase margin of about −112 degrees and a gain margin of around 9 dB. Two modes of vibration considered in the example illustrated in FIG. 2 without a coupled TMD are a first rigid body mode of the beam rotating about its bearing axis and a first cantilever bending mode (compliant mode) of the beam, and these are labelled in the FIG. 3 in the open loop plant plot.

Figure 4:
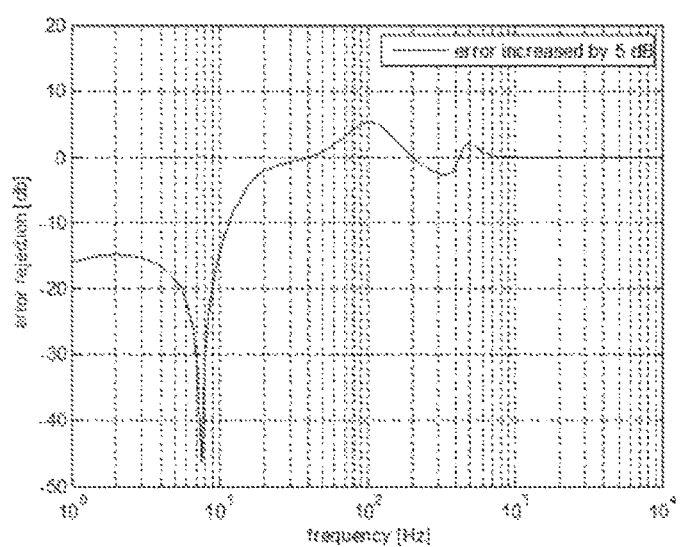
FIG. 4 illustrates an example error rejection plot for the version of a feedback control loop of the servo control system without a coupled TMD, using a digital proportional-integral-derivative (PID) implementation with no delays other than that due to discretization, according to an example embodiment.

FIG. 4 illustrates an example error rejection plot for the version of a feedback control loop of the servo control system 100 without a coupled TMD, using a digital proportional-integral-derivative (PID) implementation with no delays other than that due to discretization, according to an example embodiment. The error rejection curve shows that error is rejected up to a frequency of about 40 Hz where error is slightly increased (5 dB) in a region from 40 Hz to 200 Hz. Above 1000 Hz, there is no effect on the error.

Figure 5:
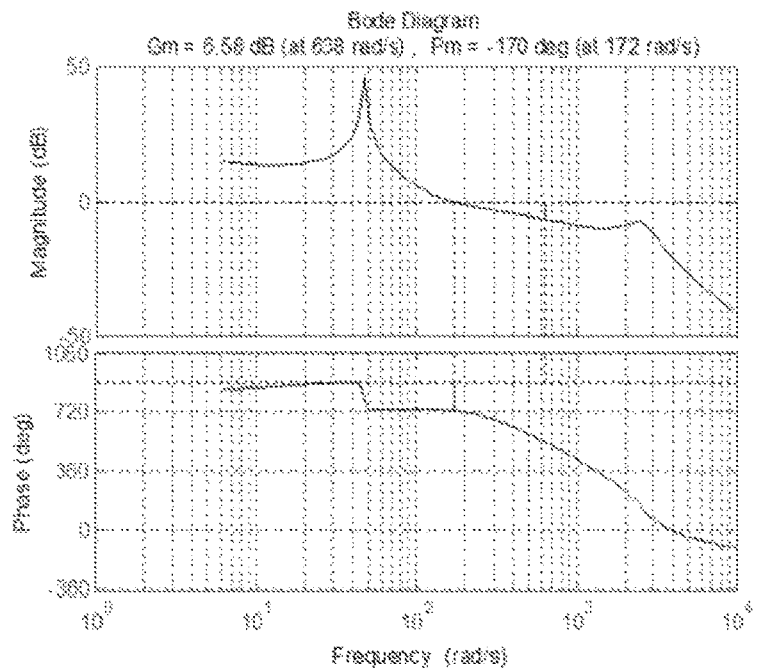
FIG. 5 illustrates an example Bode diagram plot for the version of a feedback control loop of the servo control system without a coupled TMD, using a digital proportional-integral-differential (PID) implementation with an introduction of delays, according to an example embodiment.

FIG. 5 illustrates an example Bode diagram plot for the version of a feedback control loop of the servo control system 100 without a coupled TMD, using a digital proportional-integral-differential (PID) implementation with an introduction of delays, according to an example embodiment. In this example, a latency of about two sample delays was introduced without changing other aspects, and the plot in FIG. 5 shows that this leads to poor performance. In FIG. 5, a phase margin of about −170 degrees and a gain margin of around 6.58 dB is obtained.

Figure 6:
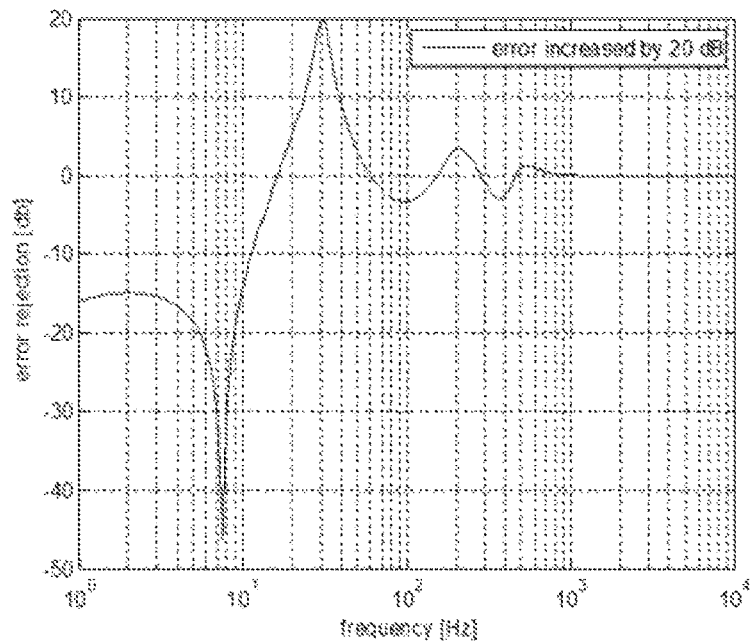
FIG. 6 illustrates an example error rejection plot for the version of a feedback control loop of the servo control system without a coupled TMD, using a digital proportional-integral-derivative (PID) implementation with an introduction of delays, according to an example embodiment.

FIG. 6 illustrates an example error rejection plot for the version of a feedback control loop of the servo control system 100 without a coupled TMD, using a digital proportional-integral-derivative (PID) implementation with an introduction of delays, according to an example embodiment. Although there is still error rejection below 20 Hz, the latency introduced increases the amplitude of the peak where error is amplified around 30 Hz. The step response of this system would show that the system oscillates at about 30 Hz and any disturbance content at that frequency would be amplified by this system. In practice, this would result in an excitable oscillation in the closed-loop system. A further increase in gain would drive the system unstable and the oscillation would increase until it reached a physical stop. This is due to an amplification peak of error at crossover when the gain is increased. Thus, a system with latency limits the bandwidth. In practice, the solution to this problem is to reduce latency or decrease gain/bandwidth. Gain and bandwidth directly equate to performance in most servo control systems.

Traditionally, in a servo control system, lead filters and/or feedback rate are used to increase phase margin. Phase margin relates to an amount of time to make a feedback correction so that the feedback is effective, or an amount of phase shift remaining between an output controlled variable and an input reference at the crossover frequency before instability will occur. When the phase margin is small, feedback can make the system worse or unstable. Both of these traditional methods are subject to noise and are difficult to achieve if the system already exhibits latency.

Using a coupled TMD 112 to the servo control system 100 provides a method for gaining phase margin that does not depend on electrical sensors or control electronics. The TMD feeds back local rate at a fixed frequency to increase servo control bandwidth.

Referring back to FIG. 2, the parameters of the TMD 112 are selected based on tuning an uncoupled resonance frequency of the TMD 112 to the crossover frequency of the servo control system 100, determining the mass 114 of the TMD 112 to be less than about 10% of a mass of the component(s) 102 being actuated, and optimizing a damping of the TMD 112 to decrease a peak of an error rejection of the servo control system 100 based on the selected frequency and mass.

Introduction of the TMD 112 at the tip of the beam acts to suppress the amplitude of the peak of the error rejection when tuned to suppress the peak in the closed-loop error rejection of the servo loop with latency. This means the increase in error is decreased without having to sacrifice the gain/bandwidth and performance at low frequencies.

Figure 7:
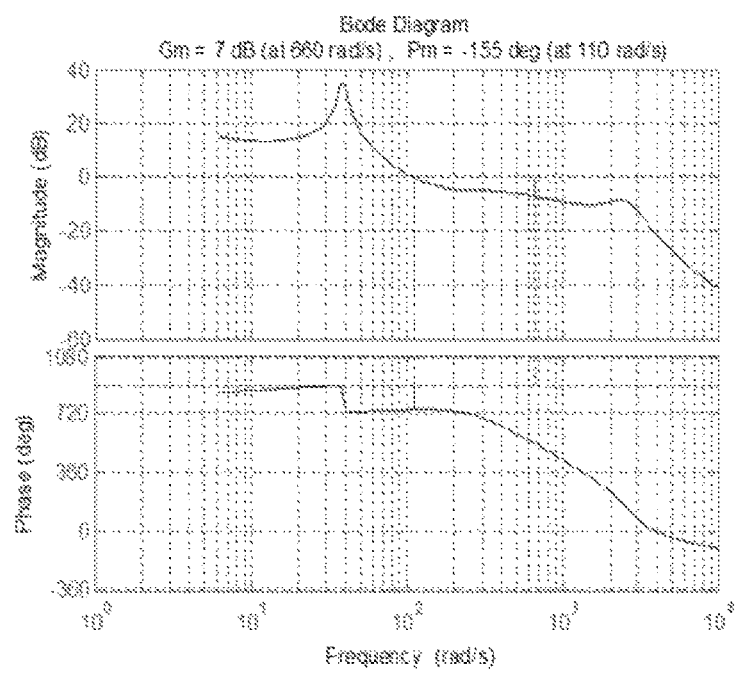
FIG. 7 illustrates an example Bode diagram plot for a version of a feedback control loop of the servo control system with the coupled TMD that has been tuned to suppress the latency-induced peak, using a digital proportional-integral-differential (PID) implementation with an introduction of delays in the system, according to an example embodiment.

FIG. 7 illustrates an example Bode diagram plot for a version of a feedback control loop of the servo control system 100 with the coupled TMD 112 that has been tuned to suppress the latency-induced peak, using a digital proportional-integral-differential (PID) implementation with an introduction of delays in the system, according to an example embodiment.

Figure 8:
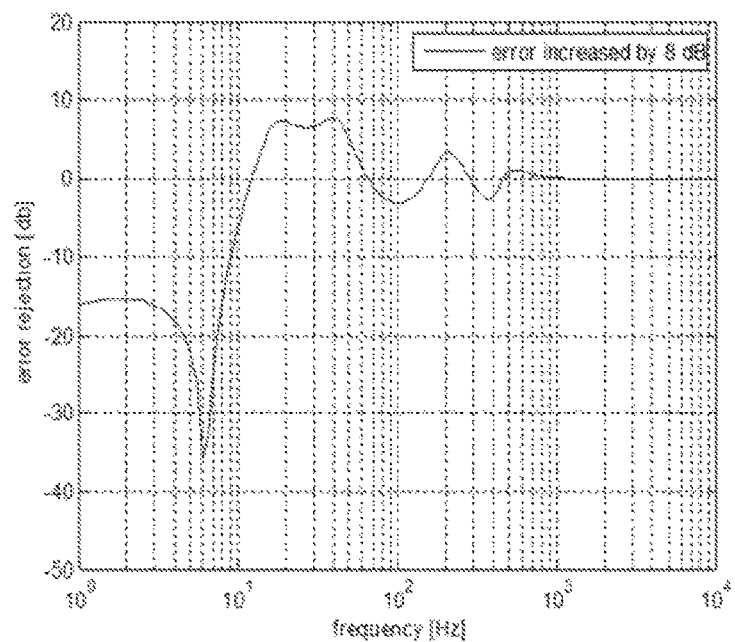
FIG. 8 illustrates an example error rejection plot for the version of a feedback control loop of the servo control system with the coupled TMD that has been tuned to suppress the latency-induced peak, using a digital proportional-integral-differential (PID) implementation with an introduction of delays in the system, according to an example embodiment.

FIG. 8 illustrates an example error rejection plot for the version of a feedback control loop of the servo control system 100 with the coupled TMD 112 that has been tuned to suppress the latency-induced peak, using a digital proportional-integral-differential (PID) implementation with an introduction of delays in the system, according to an example embodiment.

FIGS. 7 and 8 illustrate that the TMD 112 adds dynamics to the servo control system 100 to counteract the effect of latency in the closed loop control system. In this way, the TMD 112 performs loop shaping similar to a lead filter to increase phase margin. The TMD 112 naturally feeds back rate at its uncoupled resonance frequency. Since the TMD 112 does not require access to any sensors to provide feedback, this represents an opportunity to gain additional phase margin in the presence of latency without altering the control loop 110.

In FIG. 7, a phase margin of about −155 degrees and a gain margin of around 7 is obtained, which is an improvement over that shown in FIG. 5. FIG. 7 illustrates a peak between about 10 rad/s and about 100 rad/s, and a second peak between about 100 rad/s and about 10,000 rad/s. The second peak is due to compliance of the component(s) 102 indicating that the component(s) has a structural response and is not just a rigid body. The second peak may be ignored for tuning of the TMD 112.

Thus, the addition of the TMD 112 suppresses the error peak enabling an increase in gain and bandwidth more than without the TMD 112. One example benefit to this increased gain is an increase in low frequency error rejection due to increased gain possibilities. In many examples, a large amount of disturbance is usually at low frequency, and thus, use of the TMD 112 can provide a large benefit.

In FIG. 8, an 8 db maximum increase in error is achieved, which is an improvement over that shown in FIG. 6.

By changing tuning of the parameters of the TMD 112, further increases in phase margin in the presence of latency may be obtained.

Figure 9:
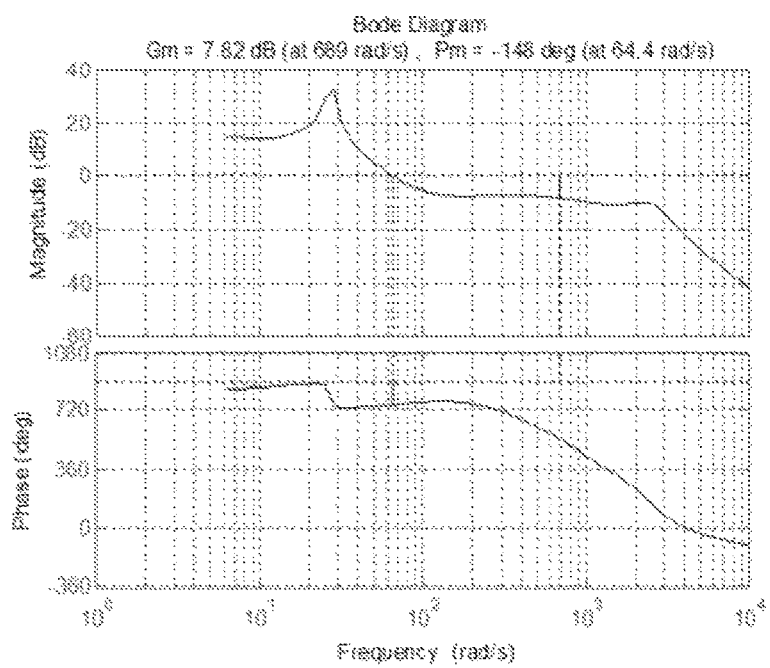
FIG. 9 illustrates an example Bode diagram plot for the servo control system configuration used in FIG. 7 with modifications to the mass and damping of the TMD, according to an example embodiment.
Figure 10:
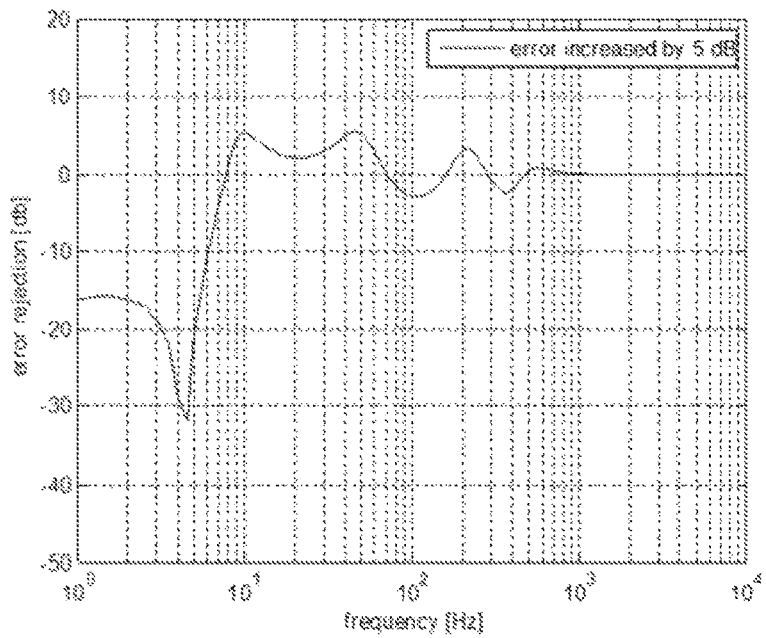
FIG. 10 illustrates an example error rejection plot for the servo control system configuration used in FIG. 8 with modifications to the mass and damping of the TMD, according to an example embodiment.

FIG. 9 illustrates an example Bode diagram plot for the servo control system 100 configuration used in FIG. 7 with modifications to the mass and damping of the TMD 112, and FIG. 10 illustrates an example error rejection plot for the servo control system 100 configuration used in FIG. 8 with modifications to the mass and damping of the TMD 112. By adding weight and changing the damping of the TMD 112, further increases in phase margin in the presence of latency can be obtained. In general, adding weight or increasing the mass 114 of the TMD 112 allows increased performance of the servo control system 100 (e.g., increased phase margin) in the presence of latency of the control loop 110.

In FIG. 9, a phase margin of about −148 degrees and a gain margin of around 7.8 is obtained, which is an improvement over that shown in FIG. 7.

In FIG. 10, a 5 db maximum increase in error is achieved, which is an improvement over that shown in FIG. 8.

Referring to FIG. 1, the system controller 106 thus operates the servo control system 100 with the coupled TMD 112 to increase phase margin and counteract a latency of the control loop 110 of the servo control system 100, and does so without altering the control loop 110 of the servo control system 100 since no sensor outputs are needed when the TMD 112 is in use.

For tuning the TMD 112, the servo control system 100 also includes a tuner 122 coupled to the system controller 106. The system controller 106 can receive outputs of the sensor(s) 120 indicating movement of the component(s) 102, and then provide instructions to the tuner 122 for tuning the TMD 112 to change functionality so as to increase the phase margin. The TMD 112 may be tunable, and may include the mass 114 that can be altered, as well as the damper 116 and the spring component 118 that can be adjusted. The tuner 112 thus can be operated to tune the uncoupled resonance frequency of the TMD 112 more closely to the crossover frequency of the servo control system 100, and to optimize the damping of the TMD 112 to decrease the peak of the error rejection of the servo control system 100 based on the selected frequency and mass. This built-in tuning capability for altering the damping and frequency allows for optimization of the closed-loop control system response in the presence of latency. Thus, the tuner 122 can adjust the parameters of the TMD 112 based on a presence of a latency of the control loop 110 of the servo control system 100.

As one example, the system controller 106 can instruct the tuner 122 to tune the TMD 112 additionally based on a frequency at which the peak of the error rejection of the servo control system 100 occurs. Thus, simulations can be run to determine the peak of the error rejection, and a frequency at which that occurs can be used to tune the TMD 112.

As another example, the mass of the TMD 112 can be determined to be between about $\frac{1}{10}$ and about $\frac{1}{50}$ of the mass of the one or more component(s) 102 being actuated. In one instance, wherein the mass of the TMD 112 is determined to be between a range of a high value and a low value, and to further decrease the peak of the error rejection of the servo control system 100, the mass of the TMD 112 is adjusted toward the high value. In another instance, the mass of the TMD 112 is determined to be between a range of a high value and a low value (e.g., $\frac{1}{10}$ and $\frac{1}{50}$ of the mass of the one or more component(s) 102), and to increase a bandwidth of the error rejection peak of the servo control system 100, the mass of the TMD 112 is adjusted toward the low value. As a result, for adding damping to the servo control system 100, the mass of the TMD 112 is determined to be based on a percentage of the moving mass or of the mass of the component(s) 102 being actuated. Thus, for larger masses of the TMD 112, the error rejection is more effectively decreased.

Tuning of the TMD 112 is performed to increase control bandwidth of the servo control system 100, and so the frequency can be tuned to be approximately equal to the open loop crossover frequency of the servo control system 100. This will add phase margin at the crossover frequency. The open loop crossover frequency can be calculated or simulated on a host structure of the actuator 104 and the component(s) 102. As an example, the open loop crossover frequency occurs at 0 dB as shown in the plots of FIG. 5, FIG. 7, or FIG. 9.

Furthermore, the damper 116 of the TMD 112 can be tuned to maximize a phase margin of the closed loop system. Once the mass 114 and the stiffness of the spring component 118 are determined, damping can be optimized to decrease a peak of the error rejection of the servo control system 100. The stiffness is determined by the frequency and mass according to a spring model.

Thus, tuning of the TMD 112 can include tuning of the uncoupled frequency to the crossover frequency of the servo control system 100, tuning of the mass 114, and tuning of the damper 116. The TMD 112 is thus positioned on the component(s) 102 to counteract a negative impact of latency in the control loop 110, and by increasing a gain or phase margin, better error rejection is seen at lower frequencies. The TMD 112 is physically attached to component(s) 102 to add dynamics to improve closed loop performance. This increases gain/bandwidth in the presence of certain latency due to digital sampling delays or other delays due to structural dynamics of the servo control system 100.

Figure 11:
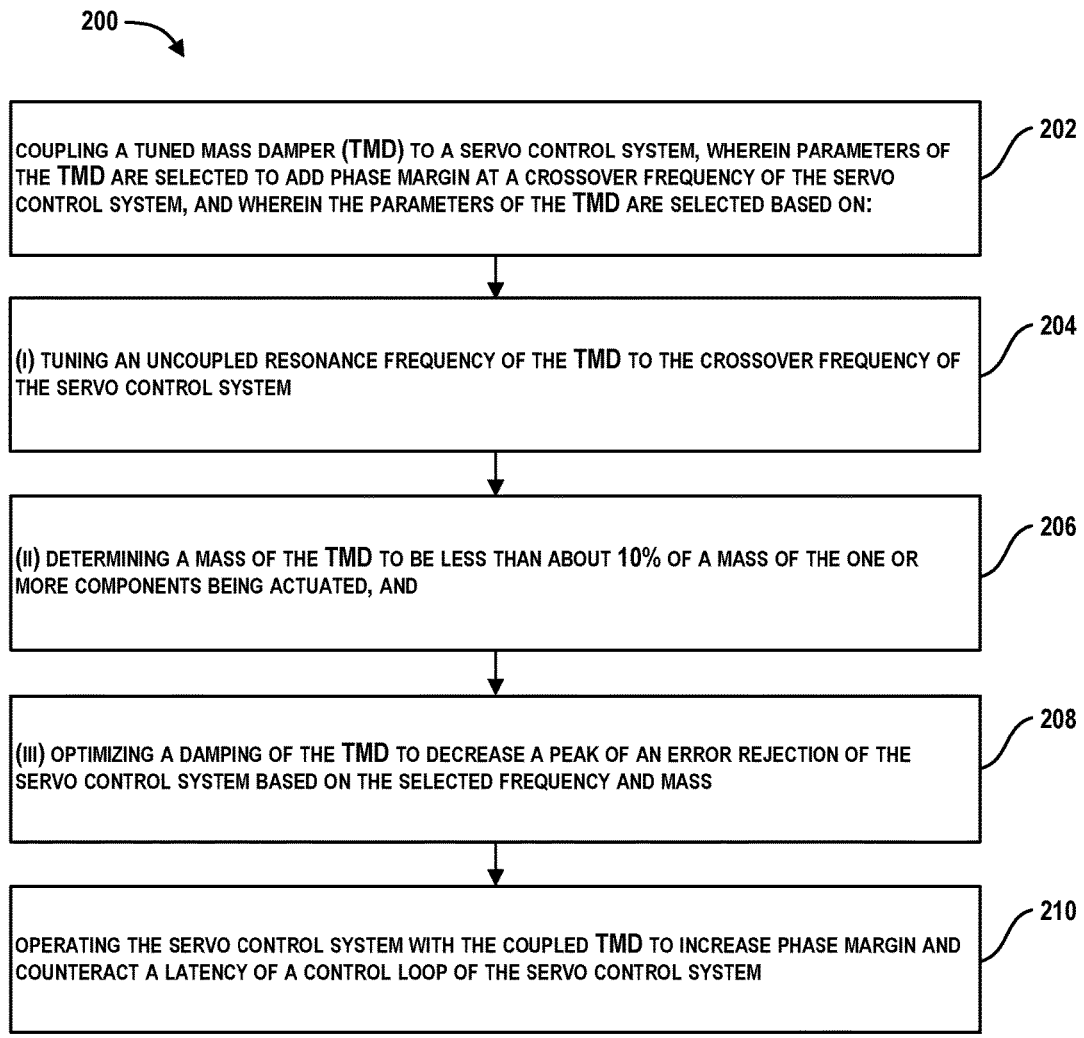
FIG. 11 shows a flowchart of an example method to increase a servo control system effective bandwidth, according to an example embodiment.

FIG. 11 shows a flowchart of an example method 200 to increase a servo control system effective bandwidth, according to an example embodiment. Method 200 shown in FIG. 11 presents an embodiment of a method that, for example, could be used with the servo control system 100 as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 coupling the TMD 112 to the servo control system 100, and the servo control system 100 includes the one or more component(s) 102 configured to be actuated for movement. The parameters of the TMD 112 are selected to add phase margin at a crossover frequency of the servo control system 100. The parameters of the TMD 112 are selected based on (i) tuning an uncoupled resonance frequency of the TMD 112 to the crossover frequency of the servo control system 100, as shown at block 204, (ii) determining the mass 114 of the TMD 112 to be less than about 10% of a mass of the one or more component(s) 102 being actuated, as shown at block 206, and (iii) optimizing a damping of the TMD 112 to decrease a peak of an error rejection of the servo control system 100 based on the selected frequency and mass, as shown at block 208.

The frequency of the TMD 112 may be selected additionally based on tuning an uncoupled resonance frequency of the TMD 112 to a frequency at which the peak of the error rejection of the servo control system 100 occurs.

The mass 114 of the TMD 112 may be determined to be between about 1/10 and about 1/50 of the mass of the one or more component(s) configured to be actuated for movement. Additional weights of the mass 114 may also be used as a percentage of the component(s) 102, such as 1/3, 1/5, 1/20, 1/40, or a mass in a range of between about 1/3 to about 1/50. For instance, the mass 114 of the TMD 112 can be determined to be less than about 5% of the mass of the one or more component(s) 102 configured to be actuated for movement. Adding mass to the TMD 112 and changing the damping of the TMD 112 further increases the phase margin of the servo control system 100 in a presence of the latency of the control loop 110 of the servo control system 100.

At block 210, the method 200 includes operating the servo control system 100 with the coupled TMD 112 to increase phase margin and counteract a latency of the control loop 110 of the servo control system 100. Such operation increases phase margin of the servo control system 100 in a presence of the latency of the control loop 110 without altering the control loop 110 of the servo control system 100. In an example, the operation of the servo control system 100 includes receiving feedback of movement of one or more component(s) 102 of the servo control system 100 being actuated, such as by outputs of the sensor(s) 120, and using the feedback within the control loop 110 to cause the actuator 104 to reduce error of the movement of the one or more component(s) 102.

Figure 12:
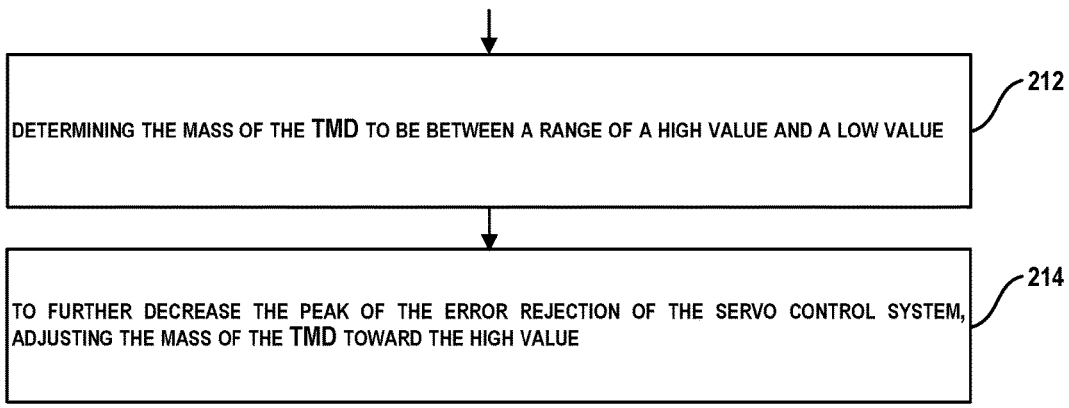
FIG. 12 shows a flowchart of an example method for use with the method, according to an example embodiment.

FIG. 12 shows a flowchart of an example method for use with the method 200, according to an example embodiment. At block 212, functions include determining the mass 114 of the TMD 112 to be between a range of a high value and a low value, and at block 214, functions include to further decrease the peak of the error rejection of the servo control system 100, adjusting the mass 114 of the TMD 112 toward the high value.

Figure 13:
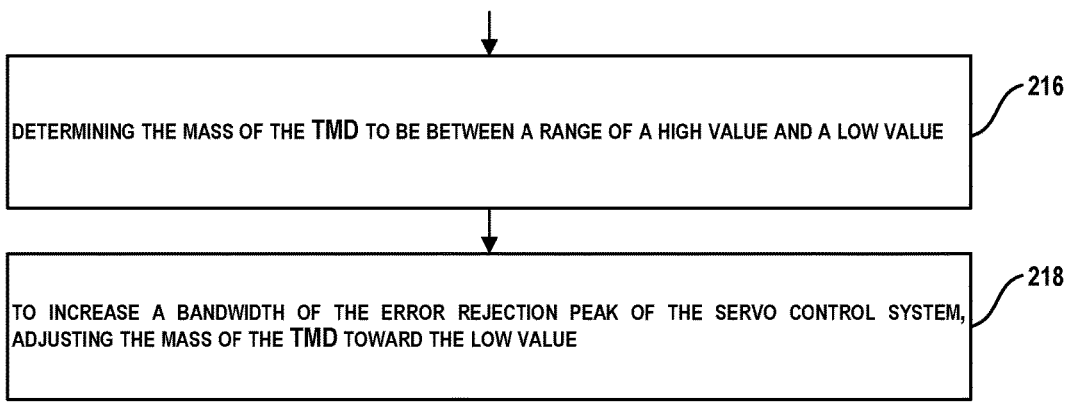
FIG. 13 shows another flowchart of an example method for use with the method, according to an example embodiment.

FIG. 13 shows another flowchart of an example method for use with the method 200, according to an example embodiment. At block 216, functions include determining the mass 114 of the TMD 112 to be between a range of a high value and a low value, and at block 218, functions include to increase a bandwidth of the error rejection peak of the servo control system 100, adjusting the mass 114 of the TMD 112 toward the low value.

Figure 14:
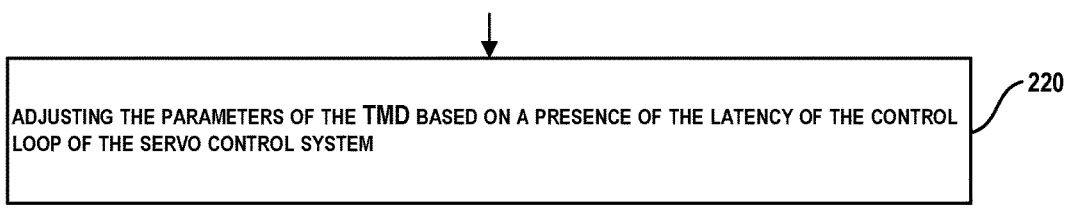
FIG. 14 shows another flowchart of an example method for use with the method, according to an example embodiment.

FIG. 14 shows another flowchart of an example method for use with the method 200, according to an example embodiment. At block 220, functions include adjusting the parameters of the TMD 112 based on a presence of the latency of the control loop 110 of the servo control system 100.

Figure 15:
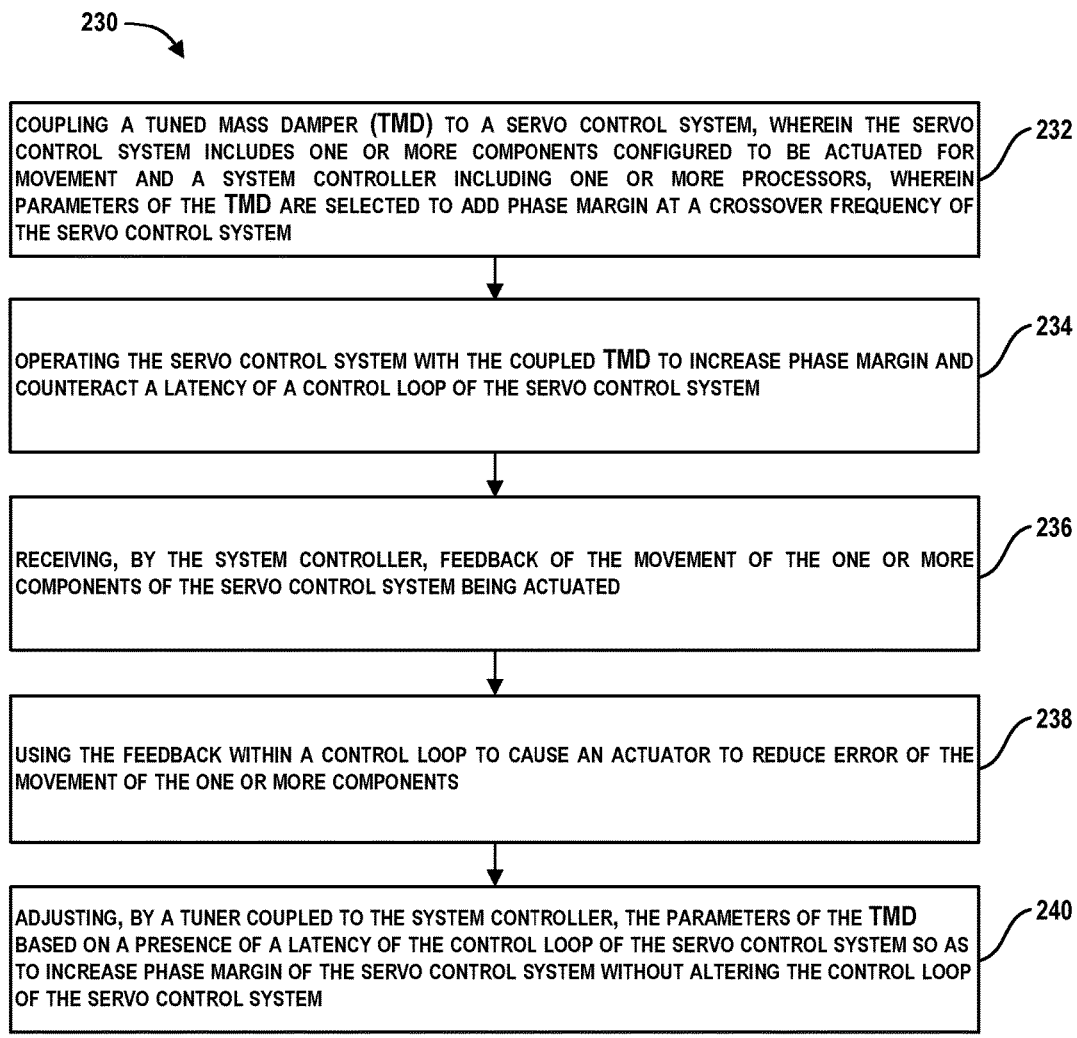
FIG. 15 shows a flowchart of an example method of operating a servo control system, according to an example embodiment.

FIG. 15 shows a flowchart of an example method 230 of operating a servo control system, according to an example embodiment. Method 230 shown in FIG. 15 presents an embodiment of a method that, for example, could be used with the servo control system 100 as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 232, the method 230 includes coupling the TMD 112 to the servo control system 100, and the servo control system 100 includes the one or more component(s) 102 configured to be actuated for movement and the system controller 106 including the one or more processor(s) 108. Parameters of the TMD 112 are selected to add phase margin at a crossover frequency of the servo control system 100.

At block 234, the method 230 includes operating the servo control system 100 with the coupled TMD 112 to increase phase margin and counteract a latency of the control loop 110 of the servo control system 100.

At block 236, the method 230 includes receiving, by the system controller 106, feedback of the movement of the one or more component(s) 102 of the servo control system 100 being actuated.

At block 238, the method 230 includes using the feedback within the control loop 110 to cause the actuator 104 to reduce error of the movement of the one or more component (s) 102.

At block 240, the method 230 includes adjusting, by the tuner 122 coupled to the system controller 106, the parameters of the TMD 112 based on a presence of a latency of the control loop 110 of the servo control system 100 so as to increase phase margin of the servo control system 100 without altering the control loop 110 of the servo control system 100. The adjusting may include tuning an uncoupled resonance frequency of the TMD 112 to a crossover frequency of the servo control system 100, and optimizing damping of the TMD 112 to decrease a peak of an error rejection of the servo control system 100.

Using the TMD 112 coupled to the component(s) 102 is a negligible additional cost when compared to control system or structural system redesign that may alternatively be needed to increase phase margins. Further, a cost savings associated with avoiding redesign late in system development provides a large value for using the TMD 112.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method to increase a servo control system effective bandwidth, comprising:
   coupling a tuned mass damper (TMD) to a servo control system, wherein the servo control system includes one or more components configured to be actuated for movement, and wherein parameters of the TMD are selected to add phase margin at a crossover frequency of the servo control system, and wherein the parameters of the TMD are selected based on:
   (i) tuning an uncoupled resonance frequency of the TMD to the crossover frequency of the servo control system;
   (ii) determining a mass of the TMD to be between about 2% and about 10% of a mass of the one or more components being actuated; and
   (iii) optimizing a damping of the TMD to decrease a peak of an error rejection of the servo control system based on the tuned frequency and the mass; and
   operating the servo control system with the coupled TMD to increase phase margin and counteract a latency of a control loop of the servo control system.

2. The method of claim 1, further comprising:
   tuning the uncoupled resonance frequency of the TMD to a frequency at which the peak of the error rejection of the servo control system occurs.

3. The method of claim 1, wherein determining the mass of the TMD to be between about 2% and about 10% of the mass of the one or more components configured to be actuated for movement comprises determining the mass of the TMD to be between about 2% and about 5% of the mass of the one or more components configured to be actuated for movement.

4. The method of claim 1, wherein operating the servo control system with the coupled TMD to increase phase margin and counteract the latency of the control loop of the servo control system comprises increasing phase margin of the servo control system in a presence of the latency of the control loop without using sensor outputs of the control loop of the servo control system.

5. The method of claim 1, wherein operating the servo control system with the coupled TMD to increase phase margin and counteract the latency of the control loop of the servo control system comprises:
   receiving feedback of movement of one or more components of the servo control system being actuated; and
   using the feedback within the control loop to cause an actuator to reduce error of the movement of the one or more components.

6. The method of claim 1, further comprising:
   determining the mass of the TMD to be between a range of a high value and a low value; and
   to further decrease the peak of the error rejection of the servo control system, adjusting the mass of the TMD toward the high value.

7. The method of claim 1, further comprising:
   determining the mass of the TMD to be between a range of a high value and a low value; and
   to increase a bandwidth of the error rejection peak of the servo control system, adjusting the mass of the TMD toward the low value.

8. The method of claim 1, further comprising:
   adjusting the parameters of the TMD based on a presence of the latency of the control loop of the servo control system.

9. A servo control system, comprising:
   one or more components configured to be actuated for movement;
   a system controller including one or more processors for receiving feedback of the movement of the one or more components, and for using the feedback within a control loop to cause an actuator to reduce error of the movement of the one or more components; and
   a tuned mass damper (TMD) physically connected to the one or more components, wherein parameters of the TMD are selected to add phase margin at a crossover frequency of the servo control system, and wherein the TMD includes a mass coupled to the one or more components, a damper connected between the mass and the one or more components, and a spring component connected between the mass and the one or more components, and wherein parameters of the TMD are selected based on:
   (i) tuning an uncoupled resonance frequency of the TMD to the crossover frequency of the servo control system;
   (ii) determining a mass of the TMD to be between about 2% and about 10% of a mass of the one or more components being actuated; and
   (iii) optimizing a damping of the TMD to decrease a peak of an error rejection of the servo control system based on the tuned frequency and the mass.

10. The servo control system of claim 9, wherein the system controller operates the servo control system with the coupled TMD to increase phase margin and counteract a latency of the control loop of the servo control system.

11. The servo control system of claim 9, wherein the system controller operates the servo control system with the coupled TMD to increase phase margin of the servo control system in a presence of the latency of the control loop without using sensor outputs of the control loop of the servo control system.

12. The servo control system of claim 9, wherein the tuned frequency of the TMD is tuned additionally based on a frequency at which the peak of the error rejection of the servo control system occurs.

13. The servo control system of claim 9, wherein the mass of the TMD is determined to be between a range of a high value and a low value; and
   to further decrease the peak of the error rejection of the servo control system, the mass of the TMD is adjusted toward the high value.

14. The servo control system of claim 9, wherein the mass of the TMD is determined to be between a range of a high value and a low value; and
   to increase a bandwidth of the error rejection peak of the servo control system, the mass of the TMD is adjusted toward the low value.

15. The servo control system of claim 9, further comprising:
   a tuner for:
      (i) tuning the uncoupled resonance frequency of the TMD to the crossover frequency of the servo control system; and
      (iii) optimizing the damping of the TMD to decrease the peak of the error rejection of the servo control system based on the tuned frequency and the mass.

16. The servo control system of claim 9, further comprising:
   a tuner for adjusting the parameters of the TMD based on a presence of a latency of the control loop of the servo control system.

17. A method of operating a servo control system, comprising:
   coupling a tuned mass damper (TMD) to a servo control system, wherein the servo control system includes one or more components configured to be actuated for movement and a system controller including one or more processors, wherein parameters of the TMD are selected to add phase margin at a crossover frequency of the servo control system;
   operating the servo control system with the coupled TMD to increase phase margin and counteract a latency of a control loop of the servo control system;
   receiving, by the system controller, feedback of the movement of the one or more components of the servo control system being actuated;
   using the feedback within a control loop to cause an actuator to reduce error of the movement of the one or more components; and
   adjusting, by a tuner coupled to the system controller, the parameters of the TMD based on a presence of a latency of the control loop of the servo control system so as to increase phase margin of the servo control system without using sensor outputs of the control loop of the servo control system, wherein adjusting includes determining a mass of the TMD to be between about 2% and about 10% of a mass of the one or more components being actuated.

18. The method of claim 17, wherein adjusting, by the tuner coupled to the system controller, the parameters of the TMD based on the presence of the latency of the control loop of the servo control system comprises:
   tuning an uncoupled resonance frequency of the TMD to a crossover frequency of the servo control system; and
   optimizing damping of the TMD to decrease a peak of an error rejection of the servo control system.

* * * * *